United States Patent
Shaffer et al.

(10) Patent No.: US 8,405,522 B2
(45) Date of Patent: Mar. 26, 2013

(54) LANE DEPARTURE HAPTIC WARNING WITH COMPENSATION FOR ROAD-CAUSED VIBRATION

(75) Inventors: Aric David Shaffer, Ypsilanti, MI (US); Prashanth Shankar, Novi, MI (US); Jeffrey Lawrence Laya, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 414 days.

(21) Appl. No.: 12/894,795

(22) Filed: Sep. 30, 2010

(65) Prior Publication Data

US 2012/0081234 A1    Apr. 5, 2012

(51) Int. Cl.
G08G 1/09 (2006.01)
B60Q 1/00 (2006.01)
H04B 3/36 (2006.01)

(52) U.S. Cl. .......... 340/905; 340/903; 340/425.5; 340/7.6; 340/4.12; 340/407.1; 701/1

(58) Field of Classification Search ............. 340/905, 340/7.6, 4.12, 407.1
See application file for complete search history.

(56) References Cited

U.S. PATENT DOCUMENTS

| | | | |
|---|---|---|---|
| 5,117,934 A | 6/1992 | Tsuyama et al. | |
| 5,432,701 A | 7/1995 | Mayer et al. | |
| 5,507,180 A | 4/1996 | Tomisawa | |
| 5,694,901 A | 12/1997 | Togai et al. | |
| 7,714,701 B2 * | 5/2010 | Altan et al. | 340/407.1 |
| 2003/0229447 A1 * | 12/2003 | Wheatley et al. | 701/300 |
| 2007/0124053 A1 | 5/2007 | Lindskog et al. | |
| 2007/0164852 A1 | 7/2007 | Litkouhi | |
| 2008/0177437 A1 | 7/2008 | Asgari et al. | |

FOREIGN PATENT DOCUMENTS

| | | |
|---|---|---|
| GB | 2368649 A | 5/2002 |
| WO | 2008089966 A2 | 7/2008 |

OTHER PUBLICATIONS

Montana State University-Bozeman, Haptic and Auditory Interfaces as a Collision Avoidance Technique During Roadway Departures and Driver Perception of these Modalities, by Laura Michelle Stanley, Apr. 2006.

* cited by examiner

*Primary Examiner* — Donnie Crosland

(74) *Attorney, Agent, or Firm* — Frank A. MacKenzie; Brooks Kushman P.C.

(57) ABSTRACT

A method of alerting the driver of a vehicle to a lane departure condition. The method includes operating a lane detection system to detect that the vehicle is experiencing a lane departure condition, operating a sensor to detect background vibration experienced by the vehicle, determining a characteristic making a haptic signal likely to be distinguishable from the background vibration, and operating a haptic signal generator in response to the lane departure condition to deliver to a driver the haptic signal having the characteristic.

19 Claims, 4 Drawing Sheets

US 8,405,522 B2

LANE DEPARTURE HAPTIC WARNING WITH COMPENSATION FOR ROAD-CAUSED VIBRATION

BACKGROUND

1. Technical Field

The invention relates to a lane departure detection and warning system for an automotive vehicle, and specifically to such a system providing a haptic warning of a lane departure condition.

2. Background Art

Automotive vehicles, such as passenger vehicles and heavy trucks, have been equipped with lane detection and lane departure warning systems. Such systems use a sensor, usually an optical sensor, which is able to detect lane markings or other road features ahead of the vehicle and determine a desired path of travel in a designated driving lane. In most such systems, a warning or alert is provided to the vehicle driver when the vehicle begins to depart from the desired driving lane. The warning or alert may be audible, visual, and/or haptic.

A haptic alert involves generating a vibration or "buzz" in a portion of the vehicle structure with which the driver is in contact, such as the steering wheel. To be effective, the haptic warning should be easily and intuitively discernible by the driver. If the vehicle is traveling over a rough or uneven road surface, the driver may feel road vibration or "noise" in the steering wheel that overpowers or masks the haptic warning. That is, the haptic warning may not be distinguishable from the road noise transmitted through the vehicle steering column and other components to the steering wheel. A haptic warning that is so strong or distinct that it serves as an unambiguous warning even in the presence of a large amount of road noise is likely to be unnecessarily strong and even annoying when driving on relatively smooth road surfaces.

SUMMARY

In a disclosed embodiment, a lane departure alerting method comprises operating a lane detection system to detect that a vehicle is experiencing a lane departure condition, operating a sensor to detect background vibration experienced by the vehicle, determining a characteristic making a haptic signal likely to be distinguishable from the background vibration, and operating a haptic signal generator in response to the lane departure condition to deliver to a driver the haptic signal having the characteristic.

In a further disclosed embodiment, a method of alerting a vehicle driver to a lane departure condition comprises detecting a lane departure condition, sensing and characterizing a background vibration caused by travel of the vehicle over a road surface, determining at least one characteristic of a haptic signal giving the haptic signal a high likelihood of being distinguishable from the background vibration by the driver, and in response to the lane departure condition delivering to the driver a haptic signal having the at least one characteristic.

In a further disclosed embodiment, a haptic alerting system for a vehicle comprises a lane detection system determining that the vehicle is departing from a path of travel, a vibration sensor detecting a background vibration caused by travel over a road surface, a controller determining a characteristic of a haptic signal required for the haptic signal to be distinguishable by the driver from the background vibration, and a haptic signal generator activated by the lane detection system to deliver the haptic signal having the characteristic to the driver.

BRIEF DESCRIPTION OF THE DRAWINGS

Embodiments of the present invention will now be described by way of example only with reference to the accompanying drawings in which.

DETAILED DESCRIPTION

Figure 1:
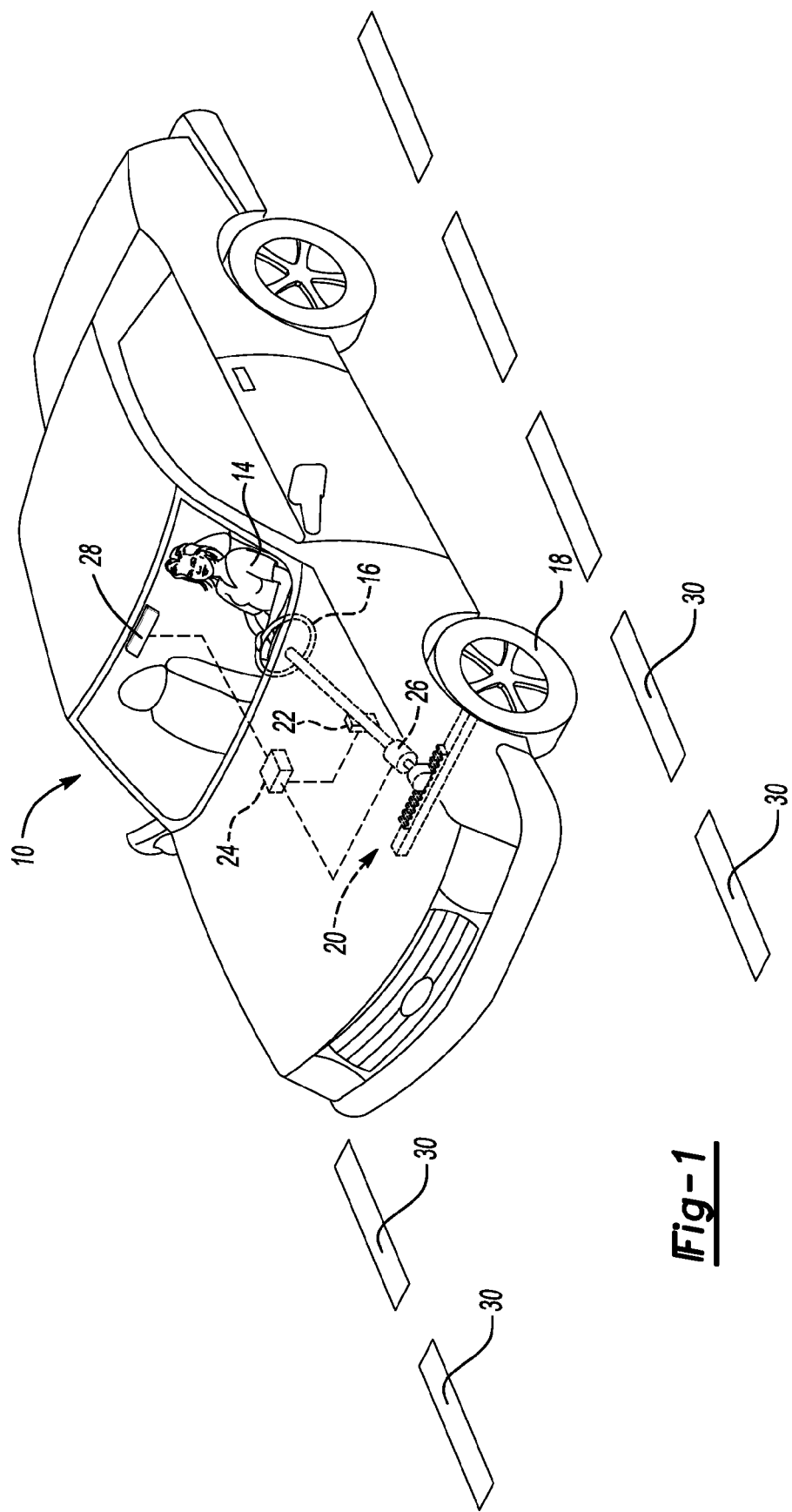
FIG. 1 is a schematic view of a vehicle equipped with a lane departure detection and haptic warning system.

As seen in FIG. 1, a vehicle 10 has a steering system though which a driver 14 steers the vehicle. The steering system will be described herein as being an electric power assisted system (EPAS) of the type well known in the automotive arts. However, the present invention may also be practiced in relation to any type of steering system, for example a conventional mechanical/hydraulic steering system, a steer-by-wire system, or an electric-hydraulic assisted system.

Driver 14 steers vehicle 10 by rotating a steering wheel 16 that is mechanically connected to the vehicle's steerable wheels 18 via steering gear 20. A torque sensor 22 detects the amount of torque driver 14 applies through the steering wheel 16 and/or steering gear 20 and generates electrical signals that, along with other sensor signals, are used by an EPAS controller 24 to control the amount of power boost provided to the steering system by an electric motor 26. Other sensors that may provide inputs to EPAS controller 24 may include a steering wheel angle sensor, vehicle dynamics sensors (speed, acceleration, wheel spin/slip, etc), a driver-actuated mode switch, etc., as is well known in the art.

Vehicle 10 is equipped with a vision-based lane detection and departure warning (LDDW) system that includes a digital camera 28. Camera 28 is mounted on vehicle 10 at a position giving it a relatively unobstructed view of the roadway ahead of the vehicle, such as behind the windshield and adjacent the driver's rear view mirror as shown in FIG. 1. Camera 28 may include a charge coupled device (CCD) and/or a complementary metal-oxide semi-conductor (CMOS) sensor. When combined with appropriate artificial-vision software, such sensors are able to detect lane markings 30, curbs, and/or other features that indicate a driving lane for the vehicle 10.

Figure 2:
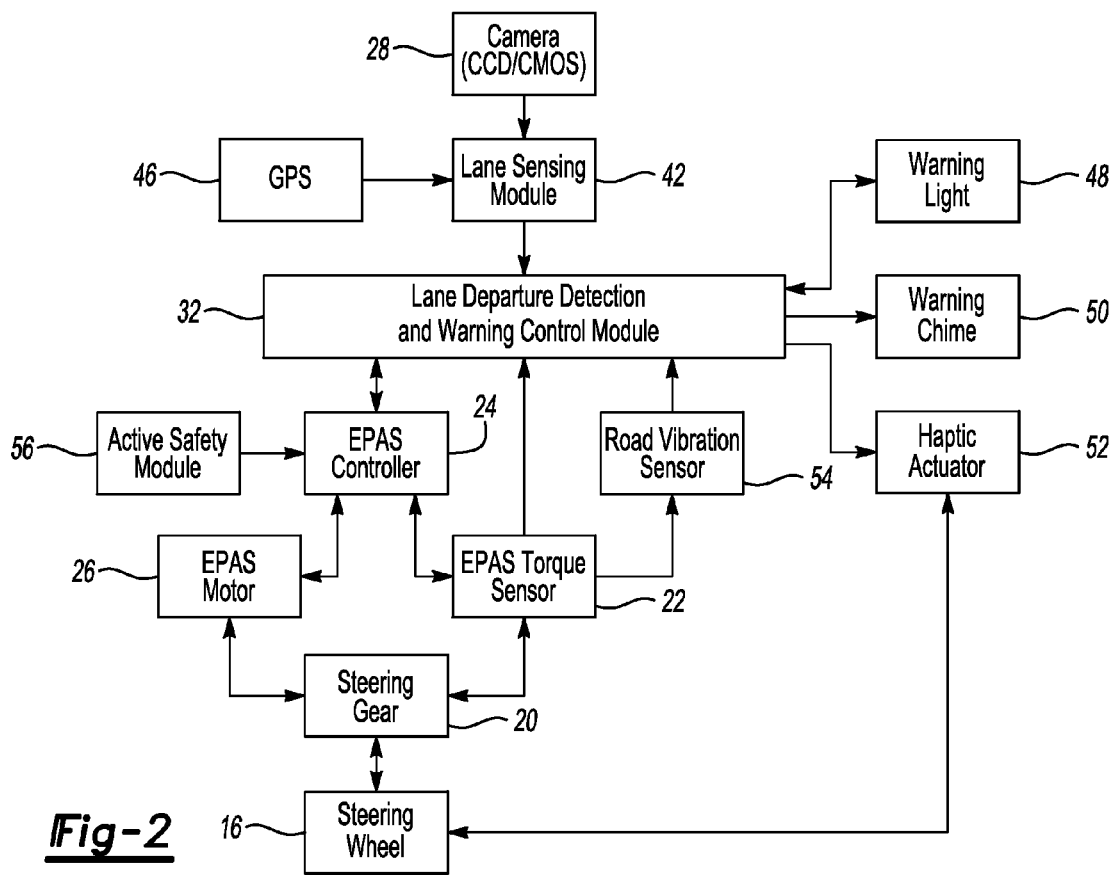
FIG. 2 is a simplified block diagram of a lane departure detection and warning system.

Referring now to FIG. 2, an embodiment of a lane detection and departure warning (LDDW) system is shown to include a LDDW control module 32 which interfaces with EPAS controller 24. Control module 32 may be a microprocessor-based device such as a computer having a central processing unit, memory (RAM and/or ROM), and associated input and output buses. Control module 32 may be an application-specific integrated circuit or other logic device known in the art, a portion of a central vehicle main control unit, or a portion of another module such as an interactive vehicle dynamics module, a restraints control module, a main safety controller, or may be a stand-alone controller as shown.

LDDW control module 32 also receives inputs from a lane sensing module 42. Lane sensing module 42 receives electrical signals from sensors such as camera 20 and applies artificial vision algorithms in a known manner in order to determine a travel lane currently occupied by the vehicle. Lane sensing module 42 may also receive signals from other sensors or systems such as a GPS device 46 and synthesize these signals with the artificial vision system.

If LDDW control module 32 determines that the vehicle is beginning to stray out of the current travel lane, one or more warnings are generated to alert the driver to the lane departure condition. These warnings may take any number of forms, for example illumination of a warning light 48, audible warnings generated by a warning chime 50, and/or a haptic warning delivered by haptic actuator 52. Haptic actuator 52 is located where it delivers vibrations at some point within the steering that may be clearly sensed by driver 14 though steering wheel 14. Haptic actuator 52 may be an electro-mechanical device.

Road vibration sensor 54 detects vibrations of the type that are likely to be felt by driver 14 through steering wheel 16. Sensor 54 may be an accelerometer, torque sensor, wheel speed sensor, or other appropriate device that generates electrical signals indicating background vibrations experienced by the vehicle, for example, those vibrations caused by traveling over a road surface. Outputs from road vibration sensor 54 may also be used by other vehicle systems such as active safety module 56 to reduce hardware costs.

An active safety module 56 may also interface with EPAS controller 24. EPAS controller 24 may include (or may receive commands from) a dynamic stability control system, a roll stability control system, or a similar system that directs steering and/or braking inputs in order to enhance safe operation of the vehicle.

In addition to generating a lane departure warning, LDDW control module 32 may also administer, command, or generate a steering intervention via EPAS controller 24. In a steering intervention, EPAS controller 24 commands EPAS motor 26 to steer the vehicle back toward the desired lane position and heading.

In a vehicle having an EPAS steering system, it is possible to generate a haptic warning using the steering system. In this case, LDDW control module 32 and EPAS controller 24 cause EPAS motor 26 to apply a varying torque to steering gear 20 that will be felt by driver 14 as a vibration in steering wheel 16. The warning signal may be, for example, a sine wave of varying torque input to the steering system. The warning torque input may be overlaid with normal steering inputs from EPAS motor 26, for example those inputs generated in response to the driver rotating the steering wheel and/or commands from the active safety module 56.

Figure 3:
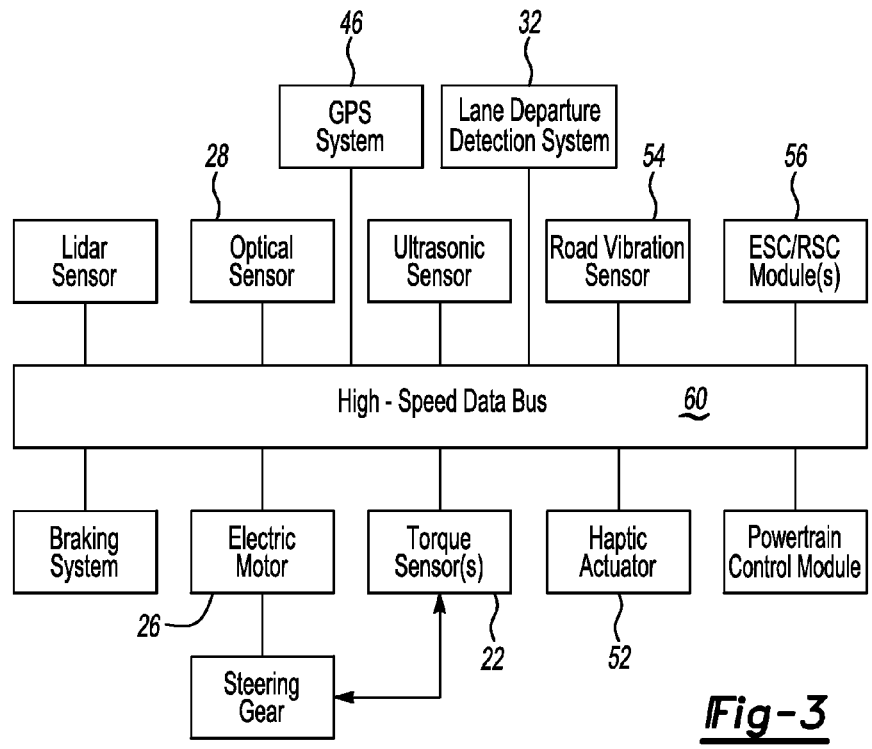
FIG. 3 is a simplified system block diagram of a lane departure detection and warning system utilizing a vehicle CAN BUS.

FIG. 3 depicts an alternative embodiment of a vehicle system architecture in which a high-speed data bus 60, such as a controller-area network (CAN) bus, interconnects appropriate vehicle electric and electronic systems.

Figure 4:
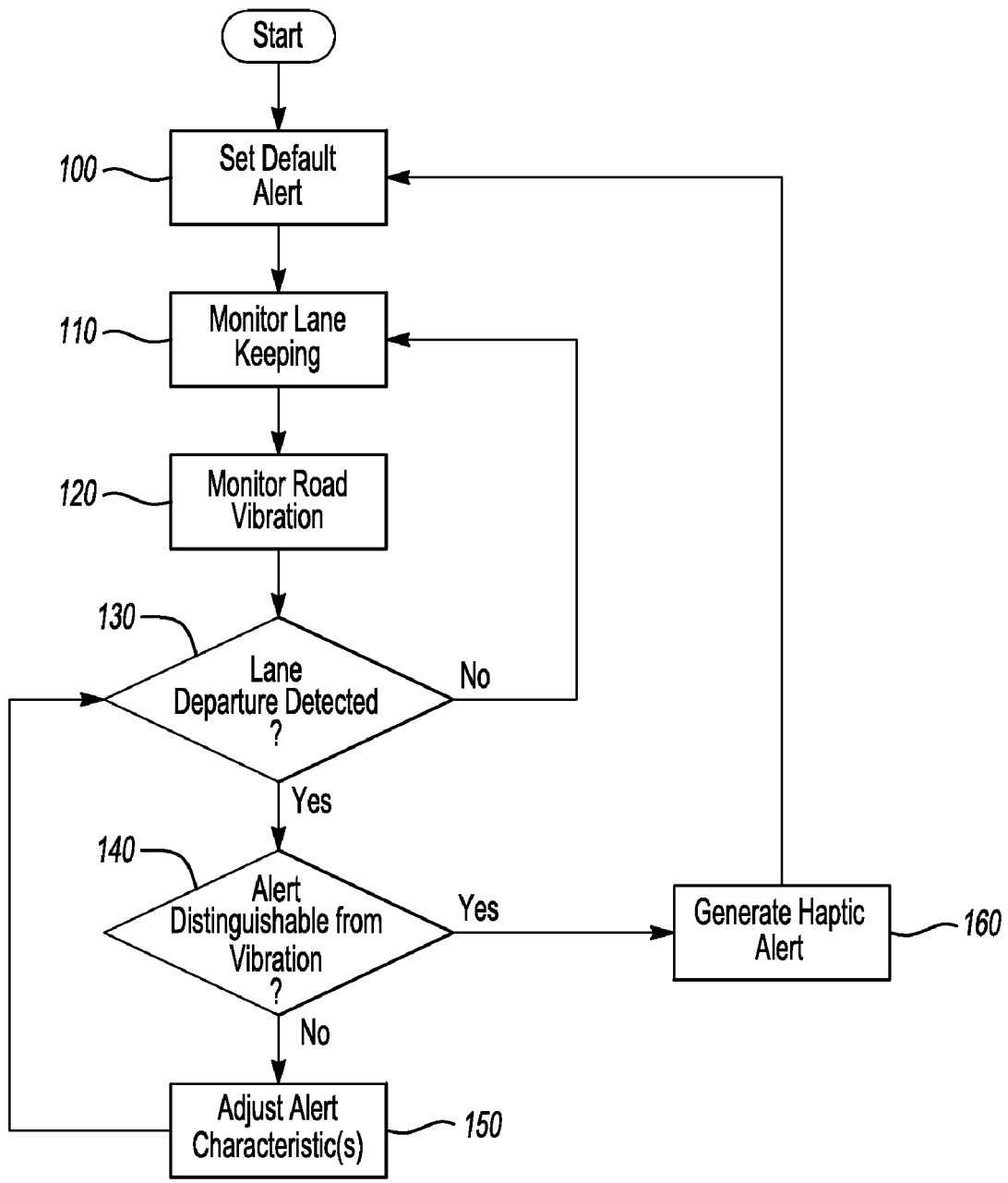
FIG. 4 is a flow chart depicting steps in a method according to an embodiment of the invention.

In the flow chart depicted in FIG. 4, the method begins at block 100 where a default haptic alert is set. The default haptic alert should have characteristics that may be expected to be easily distinguishable from a normal, base-line amount of vehicle vibration that may be sensed through the steering wheel by the vehicle driver. The characteristics of the haptic warning that may be considered when determining the default warning include, for example, signal amplitude, duration, frequency, and wave form profile.

As indicated at block 110, the vehicle LDDW system is preferably activated whenever the vehicle is in motion (or traveling above a threshold speed) and detects an impending/probable lane departure condition. At block 120, the system monitors vibrations in the steering gear of the type that may be caused by the vehicle travelling over the road surface. At block 130, if a lane departure condition is detected by the LDDW system, the method progresses to block 140. If no lane departure condition is detected, the method returns to block 100 and lane departure monitoring and road vibration monitoring continue.

When the LDDW system has detected a lane departure condition, at block 140 a comparison is made between the default haptic alert and the detected road vibration. If this comparison indicates the driver is likely to be able to distinguish the default haptic alert from the background road vibration existing at that time (block 140, "YES"), a haptic alert is generated at block 160. If the default haptic alert is not likely to be distinguishable from the road vibration (block 140, "NO"), the haptic alert characteristics are adjusted at block 150 to produce an alert that is more distinguishable. Any one or more characteristics of the alert may be adjusted in order to make it clearly distinguishable from the measured level of background road vibration. The method then returns to block 130 and if the lane departure condition is still present (block 130, "YES") the comparison at block 140 is made between the background vibration and the adjusted alert. If the adjusted haptic alert is distinguishable from the road vibration, a haptic alert of the adjusted characteristics is generated to alert the driver.

Figure 5:
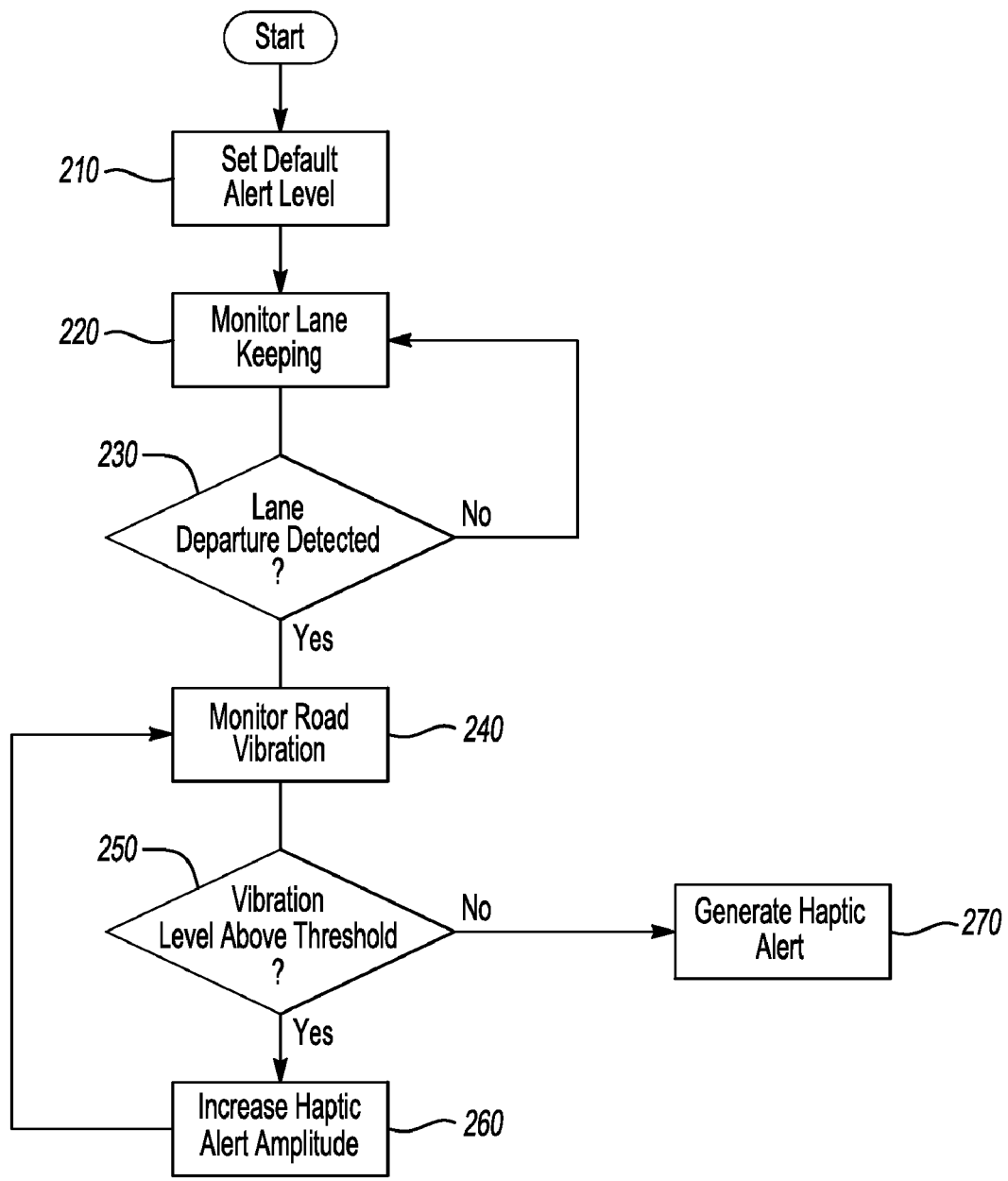
FIG. 5 is a flow chart depicting steps in another method according to an embodiment of the invention.

FIG. 5 depicts an embodiment of a method in which the only characteristics of the road vibration and haptic alert that are considered are the amplitudes. At block 210, a default haptic alert level is set. At block 220, the position of the vehicle in relation to a desired and/or current lane of travel is monitored. At block 230, if the vehicle is determined to be in a lane departure condition, the method progresses to block 240 where the background vibration caused by travel over the road surface is monitored.

At block 250, a comparison is made between the background road vibration and a threshold level of vibration. The threshold vibration level is set to be the level of vibration at which the vehicle driver is no longer considered likely to be able to distinguish the default haptic level from the road vibration. If the road vibration detected at block 240 is below the threshold level, the method progresses to block 270 and the haptic alert is generated.

If the measured background vibration level is above the establish threshold, the method progresses to block 260 where the amplitude of the haptic alert is increased to be above the measured background vibration. The method then returns to block 240 where the road vibration is continuously monitored and, at block 250, compared with the current haptic alert amplitude.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations.

While the best mode for carrying out the invention has been described in detail, those familiar with the art to which this invention relates will recognize various alternative designs and embodiments for practicing the invention as defined by the following claims.

What is claimed:

1. A lane departure alerting method comprising:
    operating a lane detection system to detect that a vehicle is experiencing a lane departure condition;
    operating a sensor to detect background vibration experienced by the vehicle;
    determining a characteristic making a haptic signal likely to be distinguishable from the background vibration; and
    operating a haptic signal generator in response to the lane departure condition to deliver to a driver the haptic signal having the characteristic.

2. The method according to claim 1 wherein the characteristic is at least one of an amplitude of the signal, a waveform of the signal, a frequency of the signal, and a rise/fall time of the signal.

3. The method according to claim 1 wherein the background vibration is caused by travel of the vehicle over a road surface.

4. The method according to claim 1 wherein the sensor is at least one of a steering wheel torque sensor, an accelerometer, and a wheel speed sensor.

5. The method according to claim 1 wherein the haptic signal is applied to a steering wheel of the vehicle.

6. The method according to claim 1 wherein the haptic signal is applied by applying a cyclic torque to a steering gear of the vehicle.

7. The method according to claim 1 wherein the haptic signal generator is an electromechanical vibrator.

8. A method of alerting a vehicle driver to a lane departure condition comprising:
    detecting a lane departure condition;
    sensing and characterizing a background vibration caused by travel of the vehicle over a road surface;
    determining at least one characteristic of a haptic signal giving the haptic signal a high likelihood of being distinguishable from the background vibration by the driver; and
    in response to the lane departure condition, delivering to the driver a haptic signal having the at least one characteristic.

9. The method according to claim 8 wherein the at least one characteristic is at least one of an amplitude of the signal, a waveform of the signal, a frequency of the signal, and a rise/fall time of the signal.

10. The method according to claim 8 wherein the background vibration is sensed by at least one of a steering wheel torque sensor, an accelerometer, and a wheel speed sensor.

11. The method according to claim 8 wherein the haptic signal is applied to a steering wheel of the vehicle.

12. The method according to claim 8 wherein the haptic signal is applied by applying a cyclic torque to a steering gear of the vehicle.

13. The method according to claim 8 wherein the haptic signal is generated by an electromechanical vibrator.

14. A haptic alerting system for a vehicle comprising:
    a lane detection system determining that the vehicle is departing from a path of travel;
    a vibration sensor detecting a background vibration caused by travel over a road surface;
    a controller determining a characteristic of a haptic signal required for the haptic signal to be distinguishable by the driver from the background vibration; and
    a haptic signal generator activated by the lane detection system to deliver the haptic signal having the characteristic to the driver.

15. The apparatus according to claim 14 wherein the vibration sensor comprises at least one of a steering wheel torque sensor, an accelerometer, and a wheel speed sensor.

16. The apparatus according to claim 14 wherein the characteristic is at least one of an amplitude of the signal, a waveform of the signal, a frequency of the signal, and a rise/fall time of the signal.

17. The apparatus according to claim 14 wherein the haptic signal is applied to a steering wheel of the vehicle.

18. The apparatus according to claim 14 wherein the haptic signal generator comprises an electric motor applying a cyclic torque to a steering gear of the vehicle.

19. The apparatus according to claim 14 wherein the haptic signal generator is an electromechanical vibrator.

* * * * *